United States Patent [19]

Logomasini et al.

[11] 3,785,761

[45] Jan. 15, 1974

[54] APPARATUS IMPROVEMENTS IN A ROTARY BLOW MOLDING MACHINE

[75] Inventors: James C. Logomasini, Springfield, Mass.; Richard K. Shelby, Hinsdale, Ill.

[73] Assignee: Monsanto Company, St. Louis, Mo.

[22] Filed: Sept. 20, 1971

[21] Appl. No.: 182,074

[52] U.S. Cl. .................. 425/387 B, 425/DIG. 205, 425/DIG. 211, 425/451
[51] Int. Cl. ............................................ B29d 23/03
[58] Field of Search ............... 425/326 B, 387 B, 425/324 B.DIG. 58, 451, 342, 243, 249, 296, 297, 310, DIG. 205, DIG. 211; 249/79; 74/568, 55

[56] References Cited
UNITED STATES PATENTS

| | | | |
|---|---|---|---|
| 2,784,452 | 3/1957 | Ruekberg et al. | 425/326 |
| 2,514,053 | 7/1950 | Gurries et al. | 74/55 X |
| 2,443,826 | 6/1948 | Johnson | 425/249 X |

FOREIGN PATENTS OR APPLICATIONS

| 420,582 | 3/1967 | Switzerland | 425/326 |
|---|---|---|---|

Primary Examiner—Richard B. Lazarus
Attorney—James C. Logomasini et al.

[57] ABSTRACT

Improvements in a multi-station rotary blow molding machine wherein a number of partible blow molds angularly spaced from each other about a main shaft on supports extending out from the axis of the machine are opened and closed by means of a cam generally surrounding the periphery of the machine. A portion of this cam is in the form of a variable thickness rib along which roller followers associated with one section of each partible mold cammingly move on opposite sides thereof at least during closing of the molds. Spring means are preferably included between the axis of the machine and each inner mold section to absorb any unplanned movement of the molds in a direction radial to the machine axis.

8 Claims, 3 Drawing Figures

PATENTED JAN 15 1974  3,785,761

INVENTORS
JAMES C. LOGOMASINI
RICHARD K. SHELBY
BY
*Michael J. Murphy*
ATTORNEY

APPARATUS IMPROVEMENTS IN A ROTARY BLOW MOLDING MACHINE

BACKGROUND OF THE INVENTION

This invention relates to a blow molding machine and more particularly to improvements in apparatus components affecting mold opening and closing in a blow molding machine of the type wherein a plurality of blow molds are angularly spaced from each other about a central main shaft.

Blow molding systems wherein a series of molds are situated on supports extending radially of a central shaft are known in the prior art, e.g., U.S. Pat. Nos. 2,579,399 and 2,784,452. As set forth in U.S. Pat. No. 3,543,339, in the type of system wherein the mold sections move radial to a horizontal machine axis during opening and closing it is also known that unless special structural arrangements are used, operating difficulties in the nature of mold chatter and vibration of certain other parts will occur during portions of the molding cycle.

More specifically, these operating difficulties are basically caused by unbalanced forces present in a continuously operating rotary machine wherein one or more relatively heavyweight molds are in the process of being closed within one segment of the periphery of the machine while other mold(s) in another segment of the machine periphery are being opened. The prior art approaches, as elucidated in the previously mentioned U.S. Pat. No. 3,543,339 have no doubt been effective in minimizing the effects of these operational dynamic forces, but they are not without deficiencies. For example, there is disclosed in U.S. Pat. No. 3,543,339, a closed track cam segment in the mold closing portion of the machine periphery for the purpose of capturing a single follower on two sides and thereby preventing it from bouncing back and forth during this critical phase of the molding cycle. There is also disclosed a pressure switch adjacent the end of this cam segment, the function of which is to shut the machine down should the resistance to mold closing force exceed a certain level as the mold passes that particular point in the machine periphery.

To ensure that the follower will move within this type of closed cam configuration and not bind on its surfaces, a certain amount of clearance between the outside diameter of the follower and the inside diameter of the cam track must be provided. However, when such clearance is built into the system, the follower has that tendency to bounce from one side of the track to the other depending on the magnitude of the various centrifugal, gravitational and cam track forces exerted thereon during mold closing, and for that matter also during mold opening. When this bouncing movement occurs, there necessarily is an abrupt change in the direction of rotation of the follower which tends to cause skidding along the track surface and accordingly a somewhat accelerated rate of follower wear. Though the load relief switch is effective in detecting excessive unbalanced forces at a particular point in the machine, it is of little or no value if such forces should be generated at other points in the path of travel of a mold about the machine periphery.

SUMMARY OF THE INVENTION

Now, however, there has been developed an alternative way of neutralizing the effect of unbalanced forces during certain critical portions of the molding cycle in a continuously operating rotary blow molding machine which minimizes difficulties existent in prior art techniques.

Accordingly, it is a principal object of this invention to provide apparatus improvements in a blow molding machine having a number of partible blow molds angularly spaced from each other about a main shaft on supports extending out from the axis of the machine.

Another object of this invention is to provide improvements in the apparatus components of a machine of the aforementioned variety which define the opening and closing movements of each blow mold.

An additional object of this invention is to provide apparatus improvements in the cam means for controlling the opening and closing movement of each blow mold in a machine of the aforementioned variety.

A further object of this invention is to provide apparatus improvements in the manner in which malfunctions or tolerance variations are accommodated in a machine of the aforementioned variety.

Other objects of this invention will in part be obvious and will in part appear hereinafter.

These and other objects are accomplished in a multi-station rotary blow molding machine which includes a number of partible blow molds arranged in angularly equispaced configuration about a main shaft and cam means for moving one section of each partible mold toward and away from the other section of each mold, by providing the improvement wherein at least the portion of the cam means which moves one section toward the other comprises a rib having a track on opposite sides thereof and roller followers associated with said one mold section for camming movement in opposite directions along each track.

The track on either side of the rib is preferably channel shaped in cross section and arranged with the opening of each channel facing in a direction parallel to the axis of the machine. The roller followers are preferably carried with each outer mold section and are sized such that they are contained within the channel shaped tracks and engage the inner faces thereof during movement of an outer mold section.

Spring means are provided for each mold, preferably between the axis of the machine and each inner mold section, to permit each partible mold to move incrementally substantially perpendicular to the axis of the machine as the followers traverse segments of the cam which control the position of the outer mold sections.

BRIEF DESCRIPTION OF THE DRAWINGS

In describing the overall invention, reference will be made to the accompanying drawing in machine

DESCRIPTION OF THE PREFERRED EMBODIMENT

Figure 1:
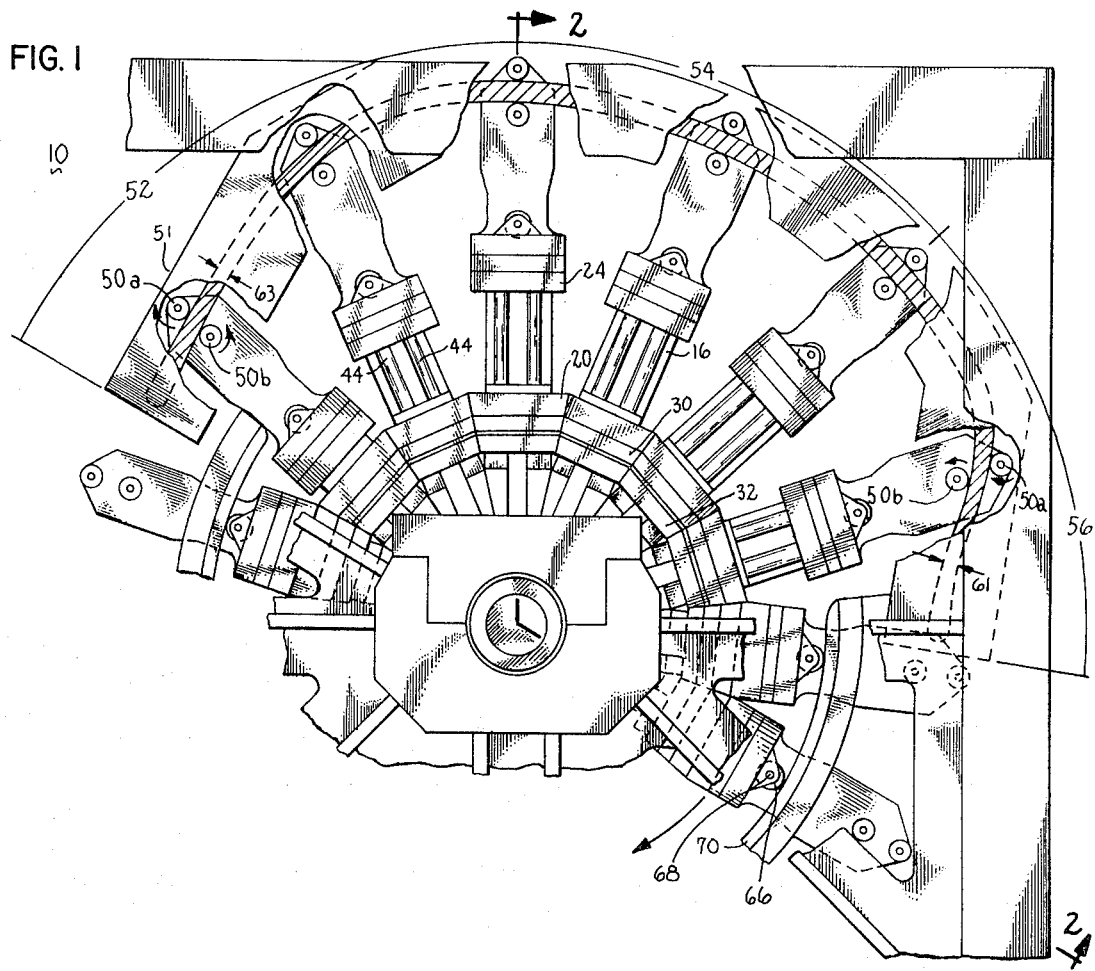
FIG. 1 is a partially schematic, fragmentary front elevational view of a blow molding macine incorporating the novel apparatus components of the present invention, with certain portions broken away and other portions in section to show details.

Referring now to the drawings, there is shown in FIG. 1, a multistation rotary blow mold machine for forming hollow articles from portions of a continuously extruding thermoplastic parison. Such extrusion means and thermoplastic parison are conventional in the prior art as shown in U.S. Pat. No. 2,579,399 and are not shown herein.

Blow mold machine 10 comprises a horizontal shaft 12 carrying a hub 14 for rotation therewith. Shaft 12 may be driven by any suitable means, such as a motor or gear reducer, or the like, not shown. A plurality of arms 16 (FIG. 2) are affixed to hub 14, constituting a spider or mold wheel. The number of arms 16 are determined according to space and process timing limitations.

Figure 3:
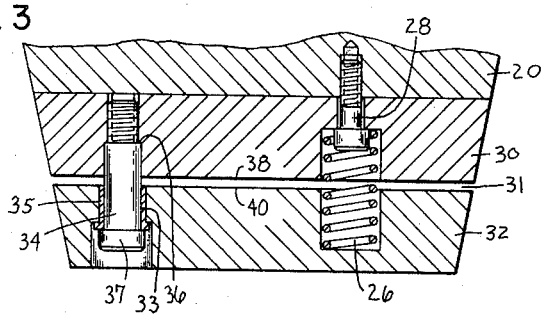
FIG. 3 is a partial, sectional view illustrating the manner of mounting each inner mold section.

Each arm 16 carries mold equipment consisting of an inner mold assembly 18 having an inner mold half 20 outermost thereon and an outer mold assembly 22 having an outer mold half 24 innermost thereon opposite inner mold half 20. Each inner mold section 20 is secured via means such as bolts 28 (FIG. 3) to inner mold carrier block 30. Spring means are provided to permit each inner mold half 20 of each partible mold to move incrementally substantially perpendicular to horizontal shaft 12 during the mold opening and mold closing portions of the cycle, to be described hereafter in more detail. These spring means in the illustrated embodiment comprise a plurality of coil springs 26 under compression, only one of which is shown in FIG. 3, each of which is situated within opposing cavity portions of inner mold carrier block 30 and back up plate 32, the latter being secured to inner mold carrier block 30 via a plurality of shoulder bolts 34, one of which is typically shown in FIG. 3. To assemble inner mold assembly 18, a spring is placed in the cavity portion of each back up plate 32 which in turn is secured to block 30 by advancing shoulder bolts 34 into threaded cavities formed therein until shoulder 36 bottoms out against a ledge in carrier block 30, the location of which is such that opposing surfaces 38 and 40 of carrier block 30 and back up plate 32 are separated from each other by a space 31 on the order of one-eighth inch when each blow mold is in fully opened position. Resilient sliding movement of mold section 20 and carrier block 30 with respect to stationary back up plate 32 as allowed by the springs 26 is along the inner surface 33 of wear bushing 35 and the opposing surface portion of shoulder bolt 34 as limited by the abutment of the underside of the head 37 of shoulder bolt 34 against the top surface of bushing 35, this latter expanded position illustrated in FIG. 3.

Outer mold half 24 is mounted with other parts of outer mold assembly 22 on a slide carriage 42, arranged to move freely along arm 16 in a radial direction, to and from inner mold half 20. For this purpose, carriage 42 is slidably supported on parallel rods 44 which are anchored at their outer ends by means of brackets 46 to each arm 16. The several stacked components of the inner mold assembly 18 and outer mold assembly 22 are so located on or with reference to rods 44 that inner mold half 20 and outer mold half 24 will at all times be in proper alignment with each other.

Figure 2:
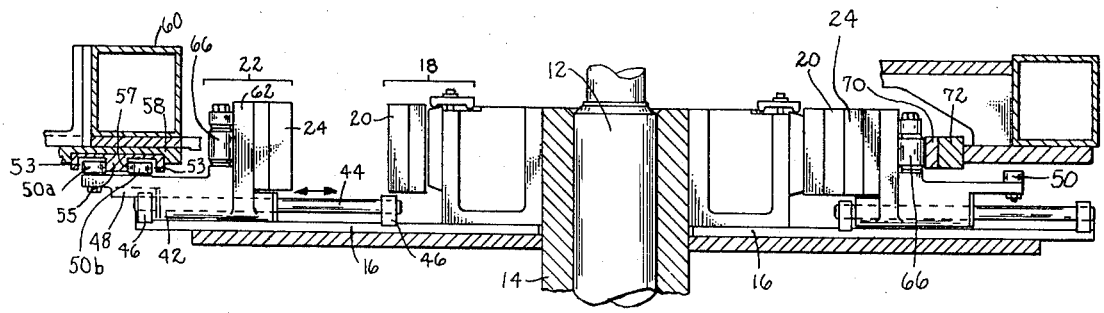
FIG. 2 is a side elevational view of the machine of FIG. 1 taken on the line 2—2 of FIG. 1, rotated 90 degrees downwardly.

As an important part of the present invention, cam means are provided for moving outer mold half 24 toward and away from inner mold half 20 to close and open each blow mold as it traverses the periphery of machine 10. These cam means include dual roller followers 50a and 50b which are radially spaced from each other and are rotatably mounted on studs extending parallel to shaft 12, these studs in turn being supported on vertical portion 48 of carriage 42. Cam 51, shown in essential part in FIG. 1, comprises an opening segment 52, a dwell segment 54 and a closing segment 56 in the form of a rib 55 (FIG. 2) mounted in cam support bracket 58 (FIG. 2) which in turn is secured to machine frame 60. The width of rib 55 in a direction perpendicular to the axis of machine 10 (note 61 and 63 in FIG. 1) necessarily varies along portions of its arcuate length to accommodate a fixed centerline distance between rollers 50 for a changing radial distance between the machine axis and the rib. Such fixed distance between rollers 50a and 50b defines a center line, the angular position of which changes with respect to a tangent to the varying width rib during movement of an outer mold section toward an inner mold section. This varying width occurs in opening segment 52 and closing segment 56. For purposes of manufacturing convenience and economy, portions 52, 54 and 56 are preferably fabricated as a single part, although it is likewise within the scope of the invention to fabricate them as separate parts, which are then assembled and secured in position for the desired camming engagement with followers 50. Single piece construction of cam 51, however, eliminates the necessity of having to perfectly align a number of cam pieces, e.g., portions 52, 54 and 56 this being necessary since if alignment is off to any extent, the relatively heavy outer mold assembly 22 supported thereon will find the dip or high point at the junction of the pieces and the pounding will start which it is the very intent of the invention to avoid. Rib 55 has dual tracks 53 formed therein in at least portions 52 and 56 and preferably also in portions 54, tracks 53 being channel shaped in cross section with the opening or mouth of each of the channels facing in a direction parallel to shaft 12. The centerline distance between the studs on which followers 50 are mounted is fixed and the tolerance thereon together with that on the width dimension of rib 55 is preferably kept tight to insure that each follower rides in continuous camming engagement with the inner face 57 of each channel shaped track 53 or in other words with the opposite sides of rib 55, as shown in FIG. 2.

Machine 10 further includes a relatively large radial cam 70 which coacts with a follower 66 rotatably mounted on horizontal shaft 68, the latter in turn being mounted on arm portion 62 of each outer mold assembly 22. Cam 70, is supported by holder 72 in the manner depicted in FIG. 2, and serves to hold each outer mold section 24 against each inner mold section 20 while the parison portion confined therein is being expanded into the shape of a hollow article and cooled prior to the mold opening portion of the cycle, which occurs when followers 50 are traversing portion 52 of cam 51.

In operation, a portion of a downwardly extruding parison (not shown) is positioned between an outer and an inner mold section 20 and 24 at about 1:30–2:00 o'clock when viewing machine 10 from the front as in FIG. 1. At this point, each mold is in open position in that sections 20 and 24 are separated from each other. Shortly thereafter, followers 50 riding in continuous engagement with surfaces 57 of channel shaped tracks 53 urge outer mold assembly 22 toward inner mold assembly 18 to close each partible mold on a parison portion. As illustrated in FIG. 1, in so doing, outer follower 50($a$) is turning in a clockwise direction whereas inner follower 50($b$) is turning in a counter-clockwise direction. Any tendency of the parts to vibrate during this portion of the cycle is thus minimized or avoided because of the camming engagement on either side of rib 55. After the outer and inner mold sections are closed upon each other by such action of followers 50 and the inward bend contour of mold closing portion 56 of cam 51, follower 66 then comes into and remains in camming engagement with the surface of radial mold closed cam 70 as the partible mold which has just been closed continues in clockwise movement when viewed as in FIG. 1 through approximately the lower two quandrants of the machine periphery. During this portion of the molding cycle, a hollow needle (not shown) is caused to conventionally penetrate the wall of the parison portion enclosed within the closed blow mold whereupon compressed air is fed through the needle to expand it outwardly against the wall of the mold cavity to form the article. It is desirable to maintain this pressure on the thus enclosed parison until the time for discharge from the mold in order to keep the walls thereof forced outwardly against the cooled walls of the mold cavity in order to chill and set the plastic of the thus molded article.

As the closed mold continues to rotate in a clockwise direction, it shortly reaches the end of mold closed cam 70, whereupon followers 50($a$) and 50($b$) will again come into contact with the inner faces 57 of channel shaped tracks 53 to begin the mold opening portion of the cycle. In so doing, followers 50($a$) and 50($b$) still rotate in the same direction as they were rotating in during the mold closing porton of the cycle, i.e., follower 50($a$) in a clockwise direction and follower 50($b$) in a counterclockwise direction. As each mold traverses mold opening cam portion 52 of cam 51, outer mold assembly 22, by reason of the outwardly directed cam contour moves away from inner mold assembly 18 to open each mold. Each formed article is thereupon ejected from the blow molding machine either manually or by automated means, and that particular blow mold returned again through circular dwell portion 54 to mold closing portion 56 of cam 51 to accept another parison portion to commence another molding cycle.

With respect to spring means 26, as each blow mold is closed on passing through mold closing portion 56 of cam 51, and each follower 66 begins to cammingly engage the surface of mold closed cam portion 70, each spring 26 is compressed a finite amount depending on the relationship between the underside of bolt head 37 and the upper surface of bushing 35 (FIG. 3), e.g. on the order of one-eighth inch, and as each blow mold is opened during traversal of mold opening portion 52 of cam 51, inner mold carrier block 30 and mold section 20 will move away from backup plate 32 an equivalent amount. Should a malfunction occur to the extent that a molded article is not properly discharged from a mold and that mold is subsequently closed on another parison portion, the just described resilient movement between faces 38 and 40 of carrier block 30 and backup plate 32 will not be as great because of the double thickness of plastic between the mold faces, or in other words spring means 26 will absorb the additional resistance to mold closing by the amount by which the mold sections are separated and thus avoid mechanical failure of the weakest portion of the stacked parts. In addition, should there by any tolerance variations in the various cam segments beyond acceptable limits, especially in the relatively large mold closed cam portion 70, spring means 26 would likewise function to absorb the additional unplanned movement of each blow mold portion as it traverses such a possibly wide tolerance portion of the cam. Also, during a fractional initial portion of the mold opening part of the cycle, outer mold assembly 22 because of the radially outwardly increasing shape of cam portion 52, should move rather rapidly outwardly compared with the position of the subsequent mold assembly, or in other words the subsequent mold assembly will be in the position illustrated in FIG. 1 while the prior mold assembly will have started to separate along the parting line of the blow mold. The coil springs on the first inner mold assembly 18, accordingly, will be in a more expanded condition versus the condition of the spring means of the next subsequent mold assembly which will still be compressed. This differential movement to the extent of the amount of deflection possible with spring means 26 tends to help to separate or break the plastic between adjacent blow molds and therefore it serves as an assist in separating the otherwise continuous string of formed articles (not shown) attached together by intermediate flash or waste portions.

As each inner mold assembly 18 moves incrementally outwardly under the influence of spring means 26 at the start of the mold opening portion of the cycle, the weight of outer mold assembly 22 is being borne by inner follower 50($b$), but then is subsequently transferred to outer follower 50($a$) as the mold continues to open subsequent to the maximum resilient movement allowed by spring means 26. Even though such an abrupt change in loading occurs in this manner on each occasion of a mold opening, followers 50($a$) and 50($b$) will nevertheless always continue to turn in the same direction as they turn in other portions of the mold opening, dwell and close sections of cam 51. Skidding and follower wear is accordingly substantially reduced or eliminated.

Various modifications and alterations will be readily suggested to persons skilled in the art. It is intended, therefore, that the foregoing be considered as exemplary only and that the scope of the invention be ascertained from the following claims.

What is claimed is:

1. In a multi-station rotary blow mold machine which includes a number of partible blow molds arranged in angularly equispaced configuration about a main shaft and cam means for moving one section of each partible mold toward and away from the other section of each mold, the improvement wherein at least the portion of said cam means which moves said one section toward the other section comprises a rib having a width in a direction substantially perpendicular to the axis of the rotary machine which varies along the portion of said cam means wherein said one mold section moves toward the other mold section and roller followers associated with said one mold section whereby each roller continuously abuts the rib substantially from the beginning of mold opening through mold closing for continuous camming movement in opposite directions along opposite sides of the varying width portion of said rib, the distance between said roller followers being fixed and defining a center line, the angular position of said center line changes with respect to a tangent to the varying width rib portion during movement of said one mold section toward the other mold section, said tangent taken at a point on the intersection of said centerline and said rib.

2. The machine of claim 1 wherein each of said roller followers are rotatably mounted on studs which extend parallel to the axis of said machine.

3. The machine of claim 1 wherein said cam means further includes portions of said rib in the section of said cam means which moves said one section away from the other section.

4. The machine of claim 1 including means associated with at least one of each of the sections of each blow mold to permit resilient movement of said one section in a direction radial to the axis of said machine.

5. A rotary blow molding machine comprising a wheel having a plurality of arms, each arm carrying a partible mold which includes an inner and an outer mold section, the outer section of which is radially movable along said arm for opening and closing said mold, a cam generally surrounding said wheel, said wheel being arranged for rotation with respect to said cam, said cam including mold opening, dwell and closing portions, each of said mold opening and closing cam portions comprising a rib of varying thickness, a pair of small diameter radially separated roller followers carried with each outer mold section for periodic rolling engagement with the faces of the rib of said mold opening and closing cam portions during rotation of said wheel, the peripheral contour of said rib being arranged for urging said followers in a direction to effect said opening during traversal of said mold opening portion of said cam and to effect said closing during traversal of said mold closing portion of said cam, and spring means to permit one section of each partible mold to move incrementally substantially perpendicular to the axis of said wheel as said followers traverse segments of the mold opening and closing portions of said cam.

6. The machine of claim 5 wherein the spring means comprises a coil spring between the axis of the wheel and the inner section of each mold.

7. The machine of claim 5 wherein the mold opening, dwell and closing portions of said cam are of one-piece construction.

8. The machine of claim 5 wherein the centerline distance between said roller followers is fixed.

* * * * *